US010579252B2

(12) United States Patent
Brombach et al.

(10) Patent No.: US 10,579,252 B2
(45) Date of Patent: Mar. 3, 2020

(54) AUTOMOTIVE TOUCHSCREEN WITH SIMULATED TEXTURE FOR THE VISUALLY IMPAIRED

(71) Applicant: FORD GLOBAL TECHNOLOGIES, LLC, Dearborn, MI (US)

(72) Inventors: Ronald P. Brombach, Plymouth, MI (US); Laura V. Hazebrouck, Birmingham, MI (US); John R. Van Wiemeersch, Novi, MI (US); Ryan E. Hanson, Livonia, MI (US); Alyssa Chatten, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 151 days.

(21) Appl. No.: 15/817,765

(22) Filed: Nov. 20, 2017

(65) Prior Publication Data
US 2018/0088770 A1 Mar. 29, 2018

Related U.S. Application Data

(63) Continuation-in-part of application No. 14/263,053, filed on Apr. 28, 2014, now Pat. No. 9,829,979.

(51) Int. Cl.
G06F 3/0488 (2013.01)
G06F 3/01 (2006.01)
(Continued)

(52) U.S. Cl.
CPC ............ G06F 3/0488 (2013.01); B60K 35/00 (2013.01); B60K 37/06 (2013.01); G06F 3/016 (2013.01);
(Continued)

(58) Field of Classification Search
CPC ........ G06F 3/0488; G06F 3/016; G06F 3/044; G06F 3/04817; G06F 3/0482;
(Continued)

(56) References Cited

U.S. PATENT DOCUMENTS 6,897,390 B2    5/2005  Caldwell et al.
7,466,843 B2   12/2008  Pryor
(Continued)

OTHER PUBLICATIONS

Bau, O. et al., Tesla Touch: Electrovibration for Touch Surfaces. Proceedings of the 23rd Annual ACM Symposium on User interface Software and Technology, Oct. 3-6, 2010, New York. pp. 283-292.
(Continued)

Primary Examiner — Tadesse Hailu
Assistant Examiner — Darrin Hope
(74) Attorney, Agent, or Firm — Frank L. Lollo; MacMillan, Sobanski & Todd, LLC

(57) ABSTRACT

Electrostatic friction textures on a touchscreen panel are used to create the sensation of braille text in a contextual menu adapted to an automotive environment. In particular, a center stack touchscreen friction display in a passenger vehicle provides one set of touch controls and HMI data to the driver while simultaneously providing either the same control options and HMI to the passenger in Braille form or a completely different set of information and menu structure in Braille form. The manner of providing a Braille display in an automobile is adapted for vehicle vibration and movement, the types of functions normally presented and/or controlled by passengers, and other challenges Braille readers of different ages, health, or experience may face when attempting to read Braille in a vehicle cabin.

24 Claims, 11 Drawing Sheets

(51) Int. Cl.
*G06F 3/044* (2006.01)
*G06F 3/0484* (2013.01)
*B60K 37/06* (2006.01)
*G06F 3/0481* (2013.01)
*G06F 3/0482* (2013.01)
*B60K 35/00* (2006.01)
*G09B 21/00* (2006.01)

(52) U.S. Cl.
CPC ............ *G06F 3/044* (2013.01); *G06F 3/0482* (2013.01); *G06F 3/04817* (2013.01); *G06F 3/04847* (2013.01); *G06F 3/04883* (2013.01); *G06F 3/04886* (2013.01); *G09B 21/003* (2013.01); *B60K 2370/1442* (2019.05); *G06F 2203/014* (2013.01); *G06F 2203/04809* (2013.01)

(58) Field of Classification Search
CPC ............ G06F 3/04847; G06F 3/04883; G06F 3/04886; G06F 2203/014; G06F 2203/04809; B60K 35/00; B60K 37/06; B60K 2350/1032; G09B 21/003
USPC ........................................................ 715/702
See application file for complete search history.

(56) References Cited

U.S. PATENT DOCUMENTS

| | | | |
|---|---|---|---|
| 7,489,303 B1 | 2/2009 | Pryor | |
| 7,834,857 B2 | 11/2010 | Prados | |
| 7,871,945 B2 | 1/2011 | Berger et al. | |
| 8,207,832 B2 | 6/2012 | Yun et al. | |
| 8,369,726 B2 | 2/2013 | Kinukawa et al. | |
| 8,593,420 B1 | 11/2013 | Buuck | |
| 2005/0030292 A1 | 2/2005 | Diederiks | |
| 2005/0285846 A1 | 12/2005 | Funaki | |
| 2007/0236450 A1* | 10/2007 | Colgate | G06F 3/016 345/156 |
| 2008/0024459 A1 | 1/2008 | Poupyrev et al. | |
| 2008/0036743 A1* | 2/2008 | Westerman | G06F 3/038 345/173 |
| 2008/0068349 A1 | 3/2008 | Rosenberg et al. | |
| 2008/0211779 A1* | 9/2008 | Pryor | G01C 21/3664 345/173 |
| 2010/0259503 A1 | 10/2010 | Yanase et al. | |
| 2010/0315345 A1 | 12/2010 | Laitinen | |
| 2012/0268386 A1 | 10/2012 | Karamath et al. | |
| 2012/0299853 A1* | 11/2012 | Dagar | G06F 3/016 345/173 |
| 2012/0313770 A1 | 12/2012 | Ziegler et al. | |
| 2012/0327006 A1 | 12/2012 | Israr et al. | |
| 2013/0016042 A1 | 1/2013 | Makinen et al. | |
| 2014/0168077 A1* | 6/2014 | Hicks | G06F 3/04883 345/157 |
| 2015/0175172 A1 | 6/2015 | Truong | |
| 2016/0299617 A1 | 10/2016 | Hanson et al. | |

OTHER PUBLICATIONS

Bau, O. et al., Tactile Feedback Technology for Augmented Reality, ACM Transactions on Graphics, vol. 31, No. 4, Article 89, Publication Date: Jul. 2012.

* cited by examiner

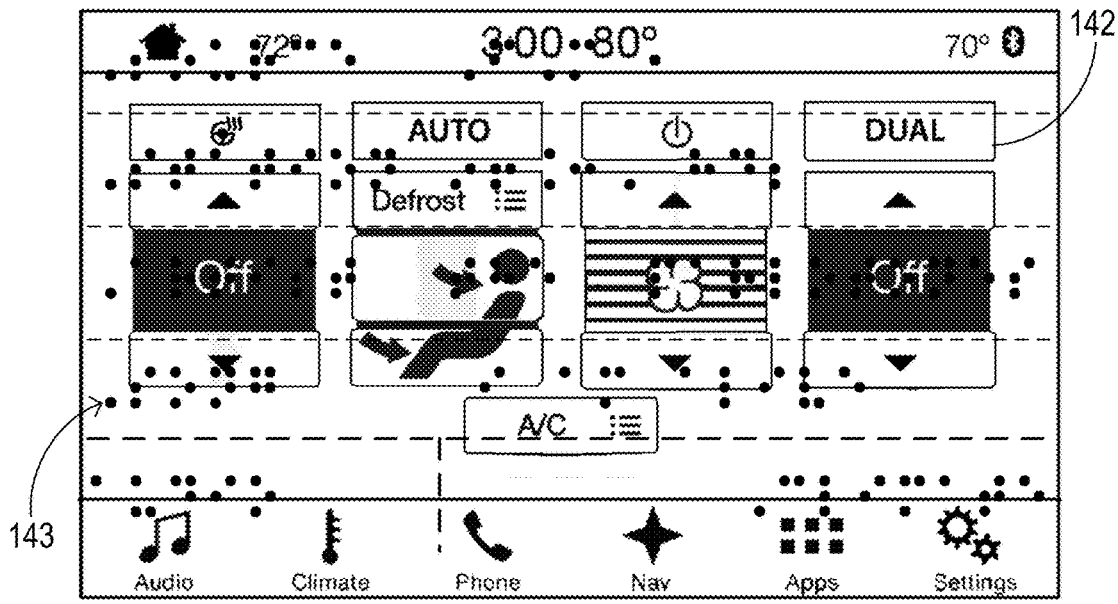
Fig. 18
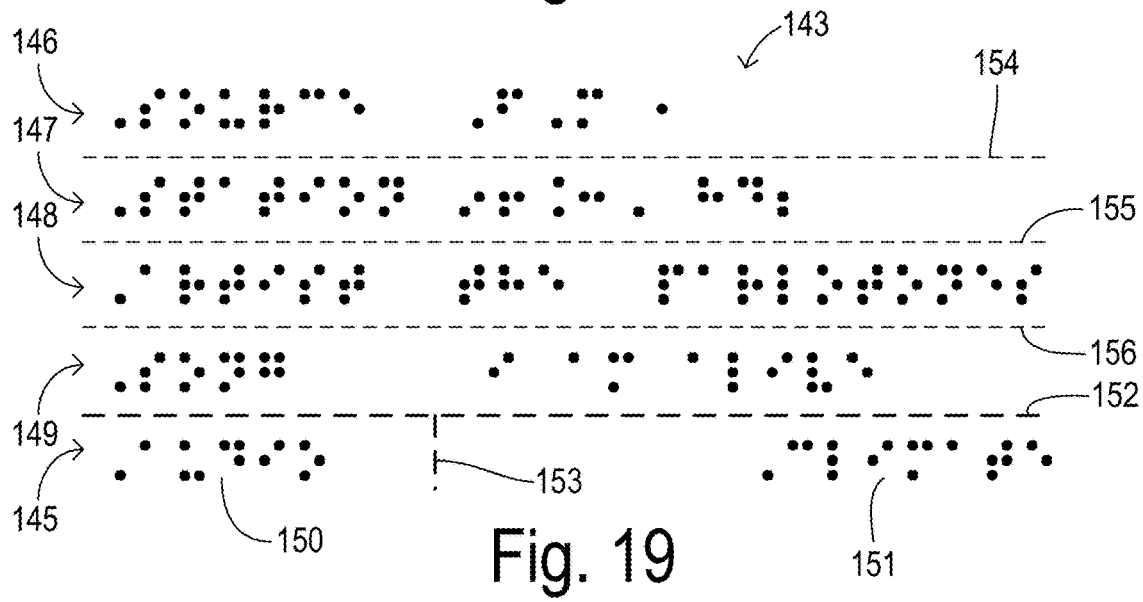
Fig. 19
| Source | FM1 |
|---|---|
| Station | 96.3, HD2 |
| Artist | The Parlotones |
| Song | I Am Alive |
| Audio | Climate |
Fig. 20

| Text/Selection Row #1 (Header Info) |
| Text/Selection Row #2 |
| Text/Selection Row #3 (Selection ↓ Area) |
| Text/Selection Row #4 (Scroll Down) |
| Active Screen ID | Next Up Screen ID |
Fig. 21
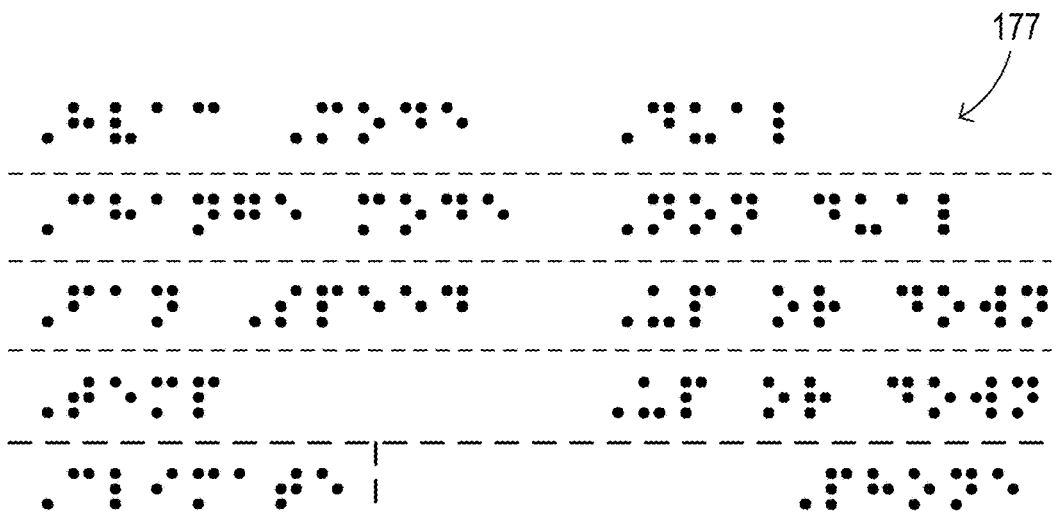
Fig. 23
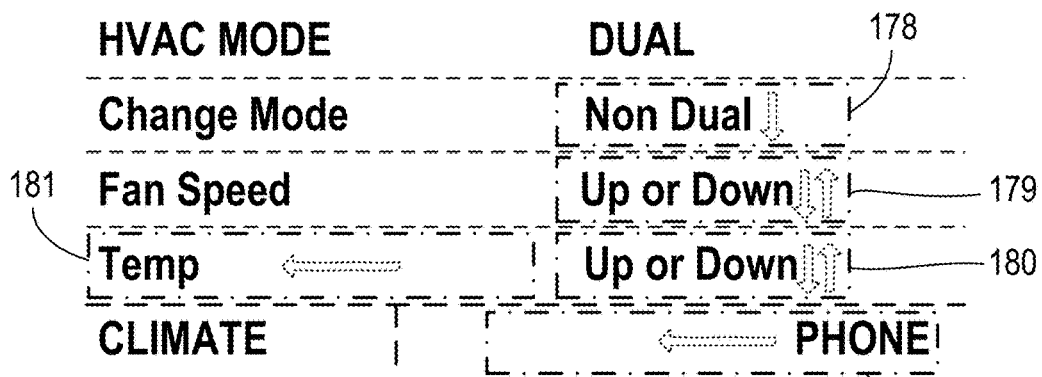
Fig. 24

AUTOMOTIVE TOUCHSCREEN WITH SIMULATED TEXTURE FOR THE VISUALLY IMPAIRED

CROSS REFERENCE TO RELATED APPLICATIONS

This application is a continuation-in-part of U.S. application Ser. No. 14/263,053, filed Apr. 28, 2014, entitled "Automotive Touchscreen Controls With Simulated Texture For Haptic Feedback," which issued as U.S. Pat. No. 9,829,979 on Nov. 28, 2017, and which is incorporated herein by reference in its entirety.

STATEMENT REGARDING FEDERALLY SPONSORED RESEARCH

Not Applicable.

BACKGROUND OF THE INVENTION

The present invention relates in general to information/control panels in mobile vehicles such as a car, truck, train, bus, or airplane, and, more specifically, to touchscreen control panels adapted to provide touch-based menu controls separate from a visual menu for use by a passenger in a secondary seating location, especially visually impaired passengers.

A typical transportation vehicle such as a car or truck includes many operator-controlled systems and accessories. In order to handle the diverse interactions with vehicle electronic systems such as a climate control system, media and entertainment system, driver information system, navigation system, or wireless communication system, a centralized control panel interface may be provided on the vehicle dashboard or instrument panel for a driver and front seat passenger or on seatbacks or console surfaces for passengers in other vehicle seating rows. Such centralized units can result in ease of use and lowering overall manufacturing costs. One common type of human-machine interface involves the use of a touchscreen for visibly displaying different context-sensitive menus with various graphical elements associated with the controlled features or systems for manipulation by the user's fingers in order to adjust various parameters of the associated electronically-controlled systems.

The ease of use and the amount of time required for making appropriate selections are important considerations for vehicle design in order to enable efficient use of the controls and to maximize the time available for the driver to attend to other tasks. In order to make displayed information and control actions on the touchscreen accessible to a front seat passenger, the touchscreen control panel is typically located at a "center stack" on the instrument panel or dashboard of the vehicle. In addition, a touchscreen control panel may also be located in other seating rows for information display and passenger control of various vehicle accessories including climate control functions and audio system functions. While the display presents a contextual menu according to the vehicle state and/or previous menu selections, the user can execute gestures (e.g., taps) on the touch-sensitive screen which are interpreted by a controller to initiate corresponding actions.

Automotive touchscreen controls are known which provide haptic feedback by mechanically moving (e.g., vibrating) the surface of the touchscreen in association with activation of a particular command (see, e.g., U.S. Pat. Nos. 7,834,857 and 8,269,726). Haptic vibration requires a motor, solenoid, or piezoelectric device to produce mechanical vibration of the touchscreen, thereby imposing significant limitations upon the touchscreen technologies and materials that can be used. Such systems are also subject to mechanical wear and failures, and they produce undesirable noise when activated.

Another type of haptic feedback for touchscreens is based upon electrostatic friction between a touchscreen surface and a user's finger (without any actual vibration of the touchscreen). For example, a system known as Tesla-Touch has been described (see, e.g., U.S. patent application publication 2012/0327006) employing a transparent electrode disposed over the touchscreen for interacting with a moving finger that slides over the transparent electrode, wherein a periodic electrical signal is applied between the electrode and finger to induce an attractive force by an electric field that is modulated to vary the friction in a desired manner such that when the finger is moved across the screen surface in the presence of the modulation, the friction pattern will simulate the feeling of different textures. For example, a sinusoidal modulation may feel like a wavy surface and a square wave modulation may feel like parallel lines or ridges.

Based on position feedback defining the location where a user's finger is making contact, the electrostatic modulation may be varied so that the sensed texture changes as the finger moves over different screen locations. With a context-sensitive menu being displayed on the touchscreen, various feature icons can appear to be raised by having an increased (perceived) sliding friction in order to allow easier positioning of the finger over the desired icon. The user can obtain additional haptic feedback on "slider" type controls by changing the friction efforts relative to the position on the slider (e.g., changing friction associated with changing audio volume, cabin temperature, or fan speed). Moreover, the haptic feedback can change the user's feel of the friction in order to indicate when a desired on/off feature setting has been selected.

Typical control panel operation is performed independently of the identity of the user who is engaged with operating the controls (i.e., whether it is the driver or a passenger). During active driving, some features of the controller may be made unavailable (e.g., suppressed from the menu selections) to prevent a driver from attempting to access tasks that would result in distraction. With the feature being suppressed, a passenger has also been prevented from accessing the menu selection since it has typically not been possible to determine which vehicle occupant is touching the control screen. However, it is possible to discriminate between the occupants in a touchscreen control system having a modulated signal injected between the user and the transparent electrode to generate the electrostatic friction by introducing unique signal properties for each separate user, as disclosed in U.S. patent application publication 2016/0299617A1, which is incorporated herein by reference in its entirety. When the passenger can be distinguished from the driver, it becomes possible to continue to provide passenger access to the driver-restricted features (e.g., entering navigation routing information or pairing Bluetooth devices) during active driving.

The features available for adjustment and the associated information displayed on a touchscreen control include some that would be useful to a visually impaired passenger. For example, it would be desirable to empower a nonsighted passenger to adjust the heating/cooling settings for their seating position, to change the volume or media source of the audio entertainment system, or to adjust other features for themselves or other occupants of the vehicle. Voice recognition can be used, but it is typically impractical to provide the capability to distinguish between the voice of the driver or other occupants. Therefore, it would be necessary to restrict access to certain features during active driving for all spoken commands. In addition, the activity of others using spoken commands could divert some attention of the driver. Therefore, it would be desirable to adapt a touch-screen control panel for use by a visually impaired passenger while maintaining normal functionality for the driver.

SUMMARY OF THE INVENTION

The present invention uses electrostatic friction textures on a touchscreen panel to create the sensation of braille text in a contextual menu adapted to an automotive environment. In particular, a center stack touchscreen friction display in a passenger vehicle provides one set of touch controls and HMI data to the driver while simultaneously providing either the same control options and HMI to the passenger in Braille form or a completely different set of information and menu structure in Braille form. The manner of providing a Braille display in an automobile is adapted for vehicle movement, the types of functions normally presented and/or controlled by passengers, and other challenges Braille readers of different ages, health, or experience may face when attempting to read Braille in a vehicle cabin.

In one aspect of the invention, a control system for a vehicle with first and second passenger seats comprises a touchscreen display for displaying a graphical HMI and detecting at least one contact point on the display established manually by touching by a finger of a passenger. A haptic texture system is provided having an electrode disposed across the touchscreen display and first and second signal generators generating first and second oscillating signals coupled to the first and second seats, respectively, to produce a respective potential difference between the finger and the electrode resulting in a corresponding perceived texture as the finger slides over the touchscreen display. A control circuit determines which of the oscillating signals is associated with a detected touch of a finger to identify a corresponding seat. The control circuit has a nonvisual mode triggered according to occupancy in the second seat. When the first seat is identified in the nonvisual mode then control actions are executed in response to a finger touch at a location defined by the graphical HMI. When the second seat is identified in the nonvisual mode then finger touches are ignored at least at some of the locations defined by the graphical HMI and the control circuit sets at least a frequency or amplitude of the oscillating signal to vary the perceived texture generated across the touchscreen display to convey nonvisual information.

BRIEF DESCRIPTION OF THE DRAWINGS

FIG. 18 is a plan view of the screen of FIG. 17 with a texture pattern for a nonvisual control mode overlaid on the visual menu.

FIG. 19 is a plan view showing the texture pattern of FIG. 18 separately.

FIG. 20 is a translated textual representation of the Braille symbols contained in FIG. 19.

FIG. 21 shows a menu architecture having a functional layout to assist in efficient navigation within a browsable Braille menu.

FIG. 23 is a Braille texture pattern according to a menu page for controlling an HVAC feature set.

FIG. 24 is a translated textual representation of the Braille symbols contained in FIG. 23, with active areas for receiving input gestures being shown.

DETAILED DESCRIPTION OF PREFERRED EMBODIMENTS

Figure 1:
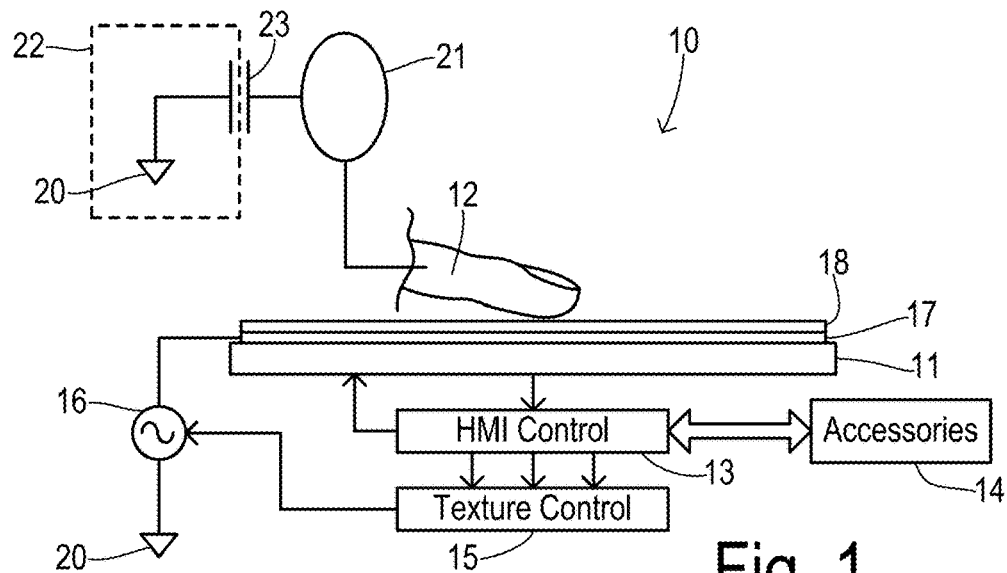
FIG. 1 is a schematic representation of a vehicle control system.

Referring to FIG. 1, a vehicle control system 10 includes a touchscreen display 11 as known in the art for displaying a graphical HMI and for detecting a contact point of a user's finger 12 (or the contact points of multiple fingertips) on touchscreen display 11, whereby a user can navigate the HMI by manually touching display 11 according to the displayed feature icons on display 11 as described below. An HMI control circuit 13 may include a display driver for providing the graphical elements and feature icons or other symbols onto display 11 and receives sensed signals for detecting the position of a contact point with finger 12. HMI control circuit 13 is coupled to various systems and accessories 14 to provide electronic control including various settings and adjustments according to a context-sensitive menu structure within the graphical HMI.

The invention includes a haptic texture system including a texture control circuit 15 coupled with a signal generator 16 that generates an oscillating signal which is provided to an electrode 17 disposed over the front surface of touchscreen display 11. An optional insulator layer 18 may be disposed over electrode 17 for insulating electrode 17 from finger 12.

Signal generator 16 is referenced to an electrical ground 20 within the vehicle. User finger 12 is coupled via the user's body 21 to vehicle ground 20 via a user grounding path 22. Grounding path 22 may preferably include a capacitive interface 23 created at a convenient contact point with the user as described in greater detail below.

As a result of the arrangement in FIG. 1, an oscillating signal from signal generator 16 produces a potential difference between finger 12 and electrode 17 resulting in a corresponding perceived texture as finger 12 slides over touchscreen display 11. Texture control circuit 15 is configured to set at least a frequency or amplitude of the oscillating signal to vary the perceived texture as the user navigates the graphical HMI. As disclosed in U.S. patent application publication 2016/0299617A1, the oscillating signal can be modulated with a unique signature that differentiates it from an oscillating signal that is coupled to a passenger in a different seating location so that the control circuit can identify which passenger is touching display 11.

HMI control circuit 13 is generally of a known type which is provided with the necessary extensions described herein for interacting with texture control circuit 15 to share information including a current contact point(s) where finger 12 is being detected and context-sensitive information including the current value or state of adjustment settings applicable to a feature icon that may be active (i.e., selected) in the menu currently visible on touchscreen display 11.

In some embodiments, the perceived texture is varied according to first and second modes while navigating the graphical HMI. The first mode relates to selection of feature icons which are the desired target for adjustment. The second mode relates to making the actual adjustment of the chosen feature.

Figure 2:
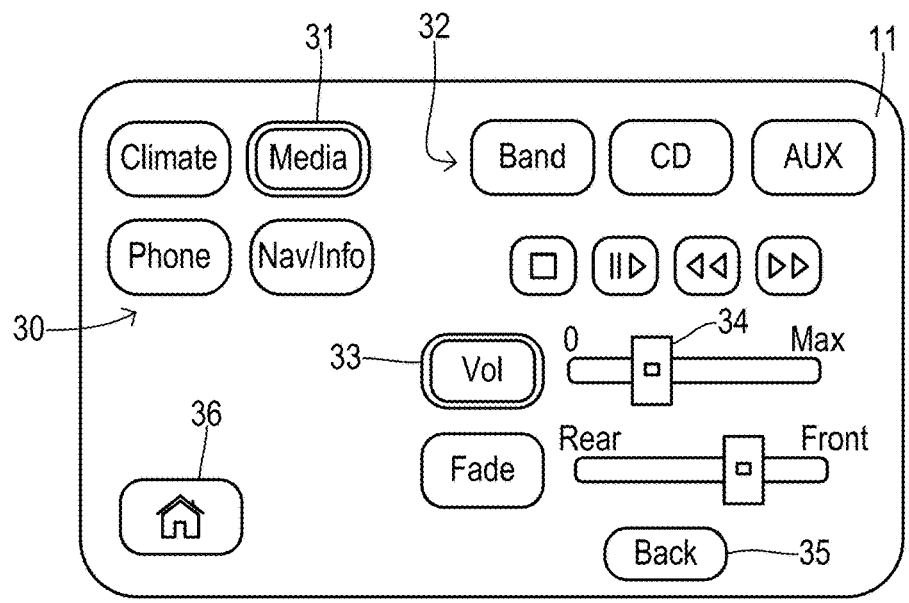
FIG. 2 shows one screen of a graphical HMI displayed by a touchscreen.
Figure 3:
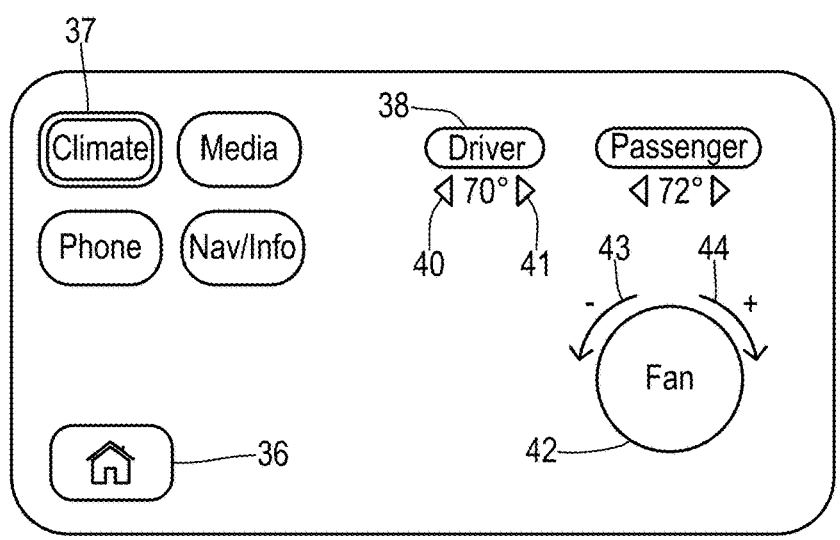
FIG. 3 shows another screen of the graphical HMI displayed on the touchscreen for adjusting a different set of vehicle features.

FIGS. 2 and 3 show example graphical menu screens for which textures in the first and second modes may be generated as disclosed herein to potentially reduce the level of the diversion of the user's attention in performing an adjustment task.

FIG. 2 shows a first example of a menu screen on display 11 including a plurality of feature icons 30 for selecting sub-menus corresponding to different subsystems. Common subsystems may include a climate control, media/entertainment system, wireless communication such as cellular phone, and a vehicle navigation/information system. A media-selection feature icon 31 is shown with a visual highlight as a result of having been manually selected. In a media-control sub-menu, a context-sensitive portion of the screen displays an interface for controlling the entertainment system using corresponding feature icons 32 to select an audio source such as radio band, CD, or auxiliary sources. Additional feature icons may include transport control buttons, volume button 33, and a speaker fade button. Feature icon 33 for controlling volume is shown as being highlighted after having been selected by the user, wherein that selection was assisted using texture mapping according to the first mode of the invention.

In the first mode for applying haptic textures for providing feedback to a finger sliding over display 11, the texture is varied according to the spatial position of the contact point of a finger on screen 11. The texture is controlled based on a mapping that identifies distinct textures for contact points that coincide with feature icons such as icons/symbols 30, 32, and 33. After selection of a particular feature icon, it may be then highlighted on display 11 (as shown for volume feature icon 33). The actual selection of an icon is handled by touchscreen display 11, and may from tapping the icon or resting the finger on the desired feature icon for a predetermined time. Since these acts do not involve sliding of the finger, feedback to the user would not be provided using texture. Once a particular feature icon is selected using the first mode, texture can again be employed in the second mode to supply haptic feedback in association with adjustment movements or gestures of the finger involving sliding.

Instead of the localized texture mapping defined according to the respective feature icon selection regions as used in the first mode, the second mode uses a status texture mapping that relates the perceived texture at any particular time to the state or intensity of the feature adjustment setting in effect at that time for the feature controlled by the feature icon that is currently selected. For example, a slider 34 is associated with volume feature icon 33 wherein the user's finger may drag slider icon 34 left or right to change the magnitude of the audio volume. As the volume intensity is adjusted, the status texture mapping causes an intensity of the perceived texture to change correspondingly. In the case of a slider adjustment like that of slider 34 wherein a one-to-one correspondence exists between the dragged position and the resulting magnitude of the controlled variable, the perceived texture intensity corresponds simultaneously to both the actual adjustment setting and the localized position of the finger contact point.

Once the user has completed their desired adjustment of the setting for the selected feature icon in the second mode, the texture control circuit needs to revert to the first mode in order to facilitate the selection of the next feature icon by the user. The change back to the first mode can be triggered by a predetermined event such as 1) the user lifting their finger up from the slider icon on touchscreen, 2) expiration of a predetermined elapsed time, or 3) finger tapping on a command icon such as a back button 35 or a home button 36.

FIG. 3 illustrates a second menu screen corresponding to activation of a climate control feature icon 37. This example shows an embodiment of the second mode wherein the intensity of the perceived texture is related to the state or magnitude of the current adjustment setting (i.e., is not related or only partially related to the physical location of the contact point). For example, after a driver temperature feature icon 38 has been selected using the first mode, the texture control circuit operates in the second mode while the user manipulates a temperature decrease icon 40 or a temperature increase icon 41. The intensity of the perceived texture can be made proportional to the magnitude of the driver temperature setting, which can be changed by sliding the finger over icons 40 and 41, respectively. When the temperature command setting increases, the "intensity" of the texture correspondingly increases, thereby providing haptic feedback to the user proportional to the temperature setting. Similarly, a fan speed feature icon 42 can be selected in the first mode (i.e., the texture having a localized intensity coincident with icon 42). Once selected, the localized texture for icon 42 is discontinued (i.e., the first mode ends) and a texture mapping is utilized coincident with adjustment arrows 43 and 44 wherein the user can obtain adjustment of the fan speed by sliding their finger in the indicated directions over icons 43 and 44 (i.e., second mode begins). As each gesture causes a change in the current adjustment setting for the fan speed, the intensity of the perceived texture that is coincident with icons 43 and 44 is proportionally changed.

Figure 4:
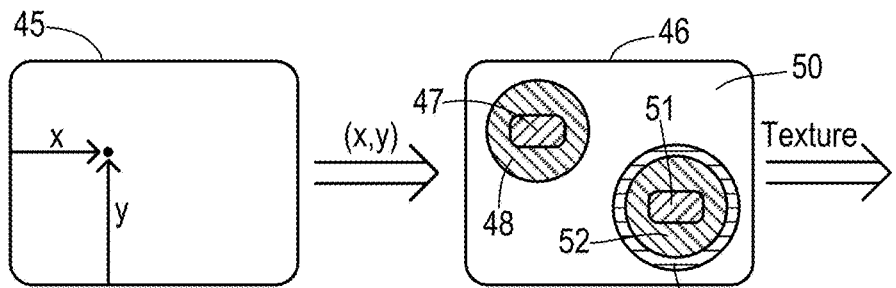
FIG. 4 depicts a texture mapping according to the invention.

One example of a localized texture mapping used for the first mode is illustrated in FIG. 4. A screen contact point detection map 45 shows the translation of a detected contact point by the touchscreen display into x and y coordinates for the contact point. In response to providing the contact point (x,y) as an input to a localized texture mapping 46, respective intensity values are obtained as an output for controlling the oscillator signal to produce the corresponding perceived texture. Each possible menu or submenu screen has a respective, context-sensitive mapping. For example, a first region 47 coincides with the location of a particular feature icon on one particular menu screen being displayed. A surrounding intermediate texture region 48 may be provided between region 47 and a background region 50 in order to create a perceived ramping of the texture as the finger nears the intended target, in order to assist in guiding the finger more easily to the intended feature icon target region 47. Background region 50 may preferably correspond to a lack of added texture so that the greatest signal to noise ratio can be provided between region 47 and background region 50. Another target region 51 corresponds to a different feature icon in the corresponding menu. A ramping up from the background texture 50 may include multiple steps, including intermediate regions 52 and 53 that surround region 51.

Figure 5:
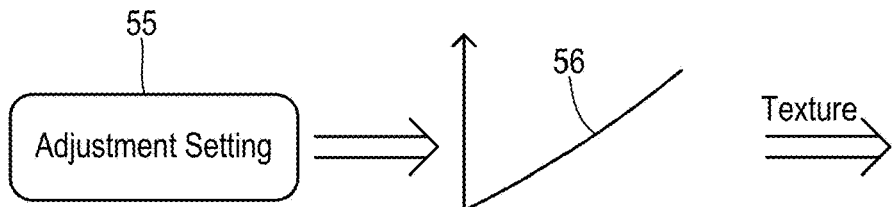
FIG. 5 depicts a texture mapping according to the invention.

FIG. 5 shows a status texture mapping for relating perceived texture to each of the potential adjustment settings available in the adjustment task for a respective feature icon. For example, the HMI control circuit or the actual subsystems being controlled provide a current adjustment setting 55 to the texture control circuit. The texture control uses setting 55 as an input to a map relating setting 55 to a particular texture. The mapping can be comprised of a plot 56 or a mathematical relationship or equation.

Figure 6A:
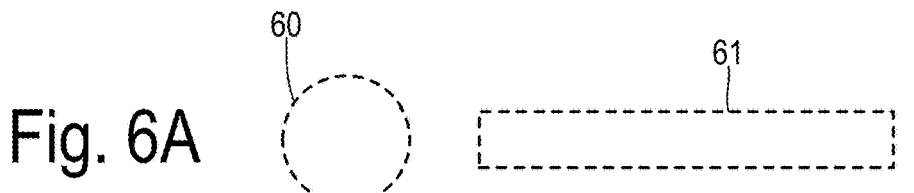
FIGS. 6A-6D show varying textures associated with feature icons and adjustment icons.
Figure 6B:
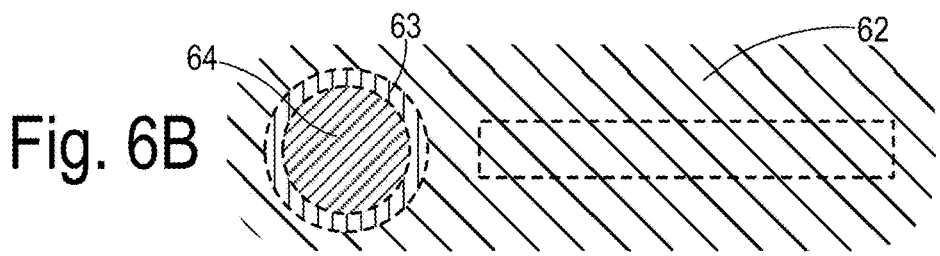
Figure 6C:
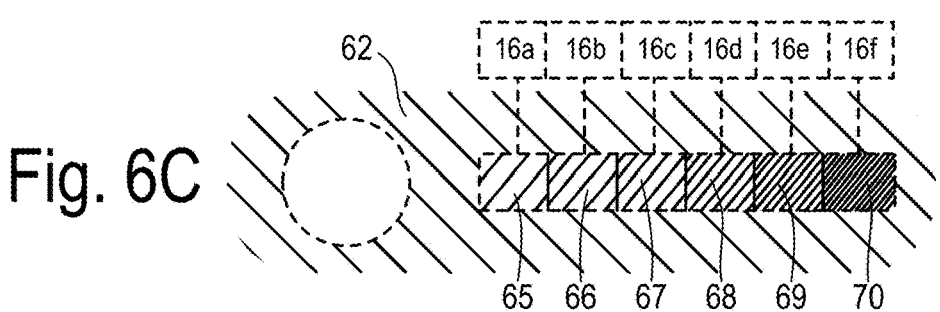

To further illustrate the changing texture mappings, FIGS. 6A-6C show variable texture regions coincident with a feature icon 60 and a slider adjustment region 61 according to one embodiment. FIGS. 6A-6C may correspond to a menu structure of the type shown in FIG. 2, for example. FIG. 6A shows the graphical elements of the HMI displayed by the touchscreen display. In FIG. 6B, the first mode generates a background texture region 62 (e.g., with zero texture) surrounding an intermediate texture region 63 and a high texture region 64. As the user's finger slides over the display, it is guided by the texture differences in order to more easily find the spot coinciding with feature icon 60. Once feature icon 60 is selected (e.g., by tapping or resting of the finger), the second mode for controlling the texture is activated as shown in FIG. 6C. The background texture 62 coincides with feature icon 60 and the regions surrounding slider icon 61. Within slider icon 61, a plurality of subregions 65-70 are produced with proportionally increasing texture intensities corresponding to the increases in the adjusted values for the targeted feature.

Figure 6D:
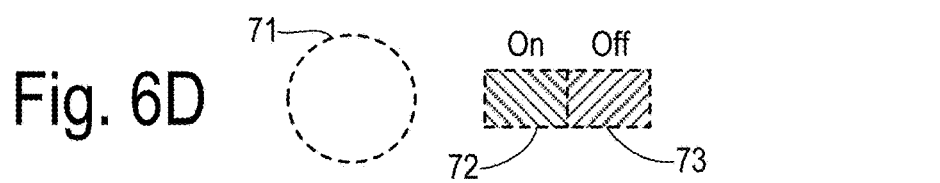

As shown in FIG. 6D, a particular feature icon 71 may have only two possible states or adjustment settings such as turning a feature on and off. In the second mode, distinct textures 72 or 73 may be activated in accordance with the on or off setting of the feature.

Figure 7A:
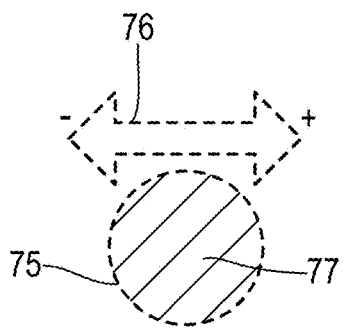
FIGS. 7A-7C show varying textures for an alternative embodiment.
Figure 7B:
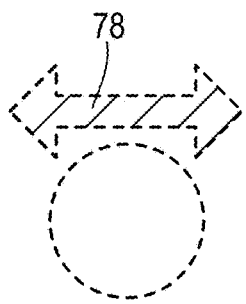
Figure 7C:
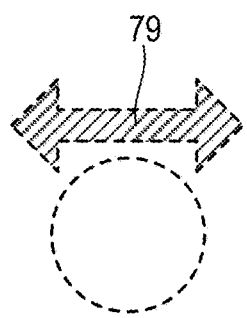

FIGS. 7A-7C illustrate various texture mappings in the first and second modes when using adjustment gestures as shown by the menu example from FIG. 3, for example. A feature icon 70 occupies a certain position on the touchscreen menu which is adjacent to an adjustment icon 76 defining a sliding location for making feature adjustment settings. FIG. 7A illustrates a texture 77 activated in the first mode allowing the position of feature icon 75 to be more easily located and selected. In the second mode, no texture would be created coincident with feature icon 75 but would instead be created in association with the location of adjustment icon 76 and having an intensity determined in response to the controlled variable. Thus, in FIG. 7B the adjustment setting may have a relatively low intensity reflected by a correspondingly low intensity of a texture 78. When the adjustment setting has a higher intensity (e.g., as the user slides or repeatedly swipes their finger in the positive direction on adjustment icon 76), then a correspondingly higher intensity texture 79 is applied as shown in FIG. 7C.

Figure 8A:
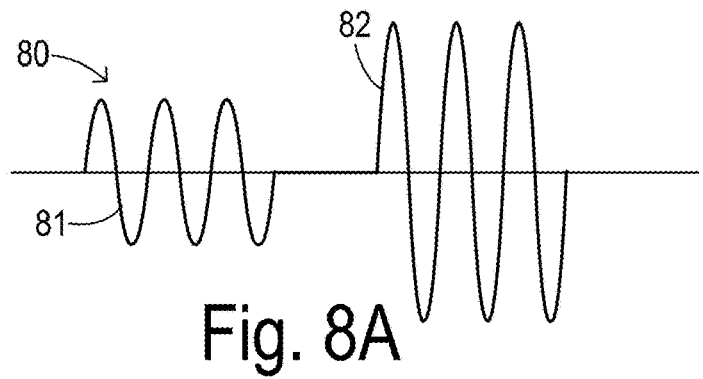
FIGS. 8A-8D show oscillating signals for creating various textures and intensities.
Figure 8B:
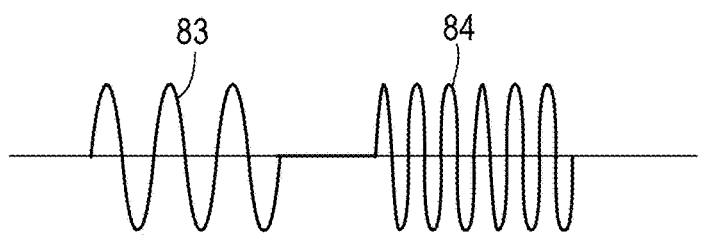

As used herein, the intensity of the texture means any different perception of texture that can be recognized by the user. These distinct perceptions can be obtained in various ways such as shown in FIGS. 8A-8D. FIG. 8A shows an oscillating signal 80 wherein a first perceived texture is obtained with a periodic signal 81 characterized by a first frequency and a first amplitude. To create a distinct texture that can be perceived as a higher intensity, another oscillating signal 82 can be employed having the same frequency and a greater amplitude. Alternatively, the frequency of the oscillating signal can be varied as shown in FIG. 8B. Thus, a first texture is obtained with an oscillating signal 83 having a first frequency and a first amplitude. A distinct or higher intensity texture is obtained using an oscillating signal 84 having the same amplitude and a higher frequency.

Figure 8C:
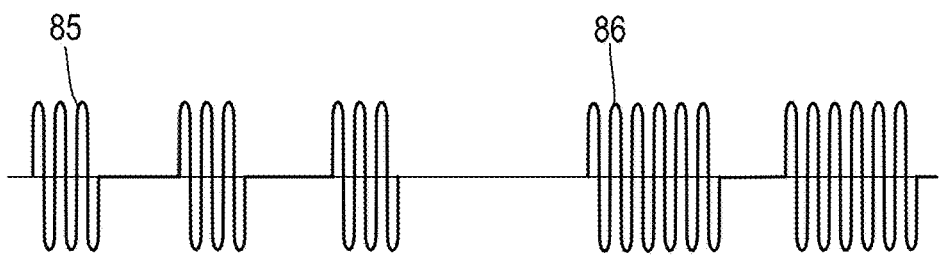

As shown in FIG. 8C, the duty cycle or pattern of the oscillating signal can be varied in order to attain different perceived textures. Thus, a first texture can be obtained using a periodic signal 85 which is modulated (i.e., turned on and off) corresponding to a first duty cycle. A contrasting texture is obtained with an oscillating signal 86 with a different duty cycle having longer on-periods than oscillating signal 85.

Figure 8D:
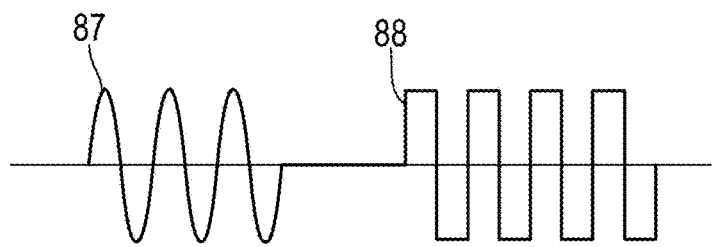

As shown in FIG. 8D, the intensity of the perceived texture can alternatively be obtained by varying the wave shape of the oscillating signal. For example, an oscillating signal 87 can be utilized having a sinusoidal shape for a first texture, and a contrasting texture with a feel of a sharper edge can be obtained with an oscillating signal 88 formed as a square wave. Using the foregoing variety of oscillator signals, various textures including perceived changes in height, waviness, or edge sharpness can be obtained.

Figure 9:
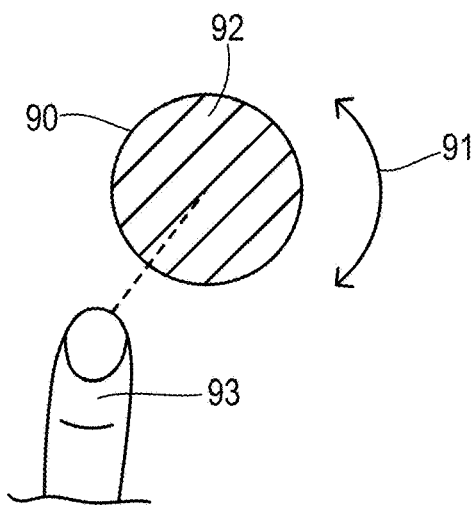
FIGS. 9-11 are plan views showing a two-finger approach for selecting a feature and adjusting a feature setting.
Figure 10:
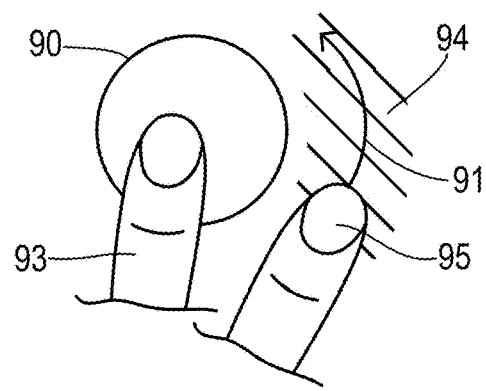
Figure 11:
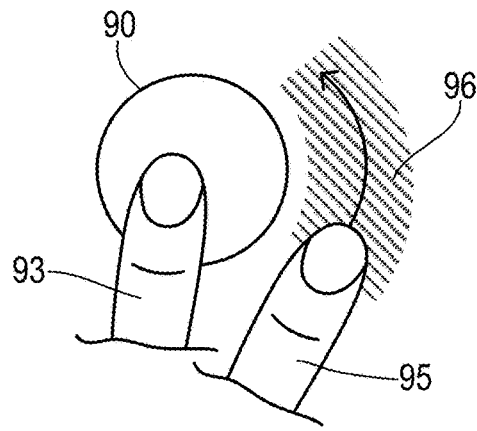

One particularly advantageous gesture system involving the variable textures of the invention is shown in FIGS. 9-11. These gestures can involve the use of two of the user's fingers, such as an index finger and the adjacent middle finger. Thus, a feature icon 90 has an associated adjustment icon 91. In the first mode shown in FIG. 9, the user's finger 93 slides over the display and is guided by a distinct texture 92 mapped to feature icon 90 by the localized texture mapping. Once finger 93 rests on icon 90, then the second mode is activated as shown in FIG. 10 wherein a texture 94 is generated over adjustment icon 91 using the status texture mapping and the then current adjustment value of the target feature. As long as finger 93 remains engaged with icon 90, the texture is defined by the second mode. A second finger 95 can then interact with adjustment icon 91 while a texture 94 is generated according to the status texture mapping in FIG. 10. As finger 95 slides over adjustment icon 91 in a direction resulting in an increase in the feature adjustment setting, the intensity of the texture increases (as shown by an increased intensity texture 96 in FIG. 11). This arrangement is very advantageous since the user can quickly locate the first finger on the desired feature icon and then the second finger will be automatically located in the appropriate region for performing adjustments using the second mode of texture variation. Therefore, a desired fine tuning of the adjustment can be obtained by the user without requiring the user to continue looking at the touchscreen display. When the first finger is no longer engaged with icon 90, then the texture control circuit may switch back to the first mode automatically so that the next feature icon can be selected by the user.

The signal generator 16, full screen electrode 17, and display as shown in FIG. 1 will result in the same texture applied to the entire screen. This may be fine for HMI button or control strategies that use one finger since the location of the finger can be detected by the touch screen and the texture signal can be modified as required to match the movements of the finger as detected by the touch screen. However, for strategies that require two fingers such as those shown in FIGS. 10 and 11, or to account for situations where the user may use two fingers to slide across a slider making it difficult to know the location of the finger, it would be desirable for the system comprised of display 11 and layers 17 and 18 to have the ability to create localized patterns in which different signals can be directed to just these localized areas of the screen in order to achieve some of the unique patterns described above. This can be done in a few ways.

For a friction strategy that uses different textures in certain zones, such as the HMI methods proposed in FIGS. 6B through 7C, it may be preferred to create multiple signal generators that connect to segmented shapes on an alternate version of layer 17 designated here as 17' (not shown). Layer 17' could be a circuit board with copper traces representing the patterns required for a slide bar or a rotary knob and then each of the pieces of these patterns would be controlled by a separate signal generator source with the appropriate signal frequency and amplitude required to create the desired textures. For example, to generate the slide bar of FIG. 6C, the six segments 65 through 70 would be driven by respective signal generators 16a, 16b, 16c, 16d, 16e, and 16f. Alternatively, to create the rotary function shown in FIGS. 10 and 11, there could be two zones driven by signal generators 16a and 16b. Having two signal sources would protect for the situation where the finger being used as the pivot point may drift as the customer performs the rotation action. If their finger does drift, it would feel the same texture as the swiping finger and they would likely be confused. However, this can be addressed by creating two different signal frequencies and/or amplitudes for different zones.

Layer 17' would be located behind the display 11. With layer 17' behind the display it would not impact viewing of the graphics generated by the HMI controller 13. However, due to the greater distance between the surface 18 and the electrode 17', it may be necessary to increase the magnitude of the signal from generator 16 in order to maintain the desired signal strength at the display surface 18.

Figure 12:
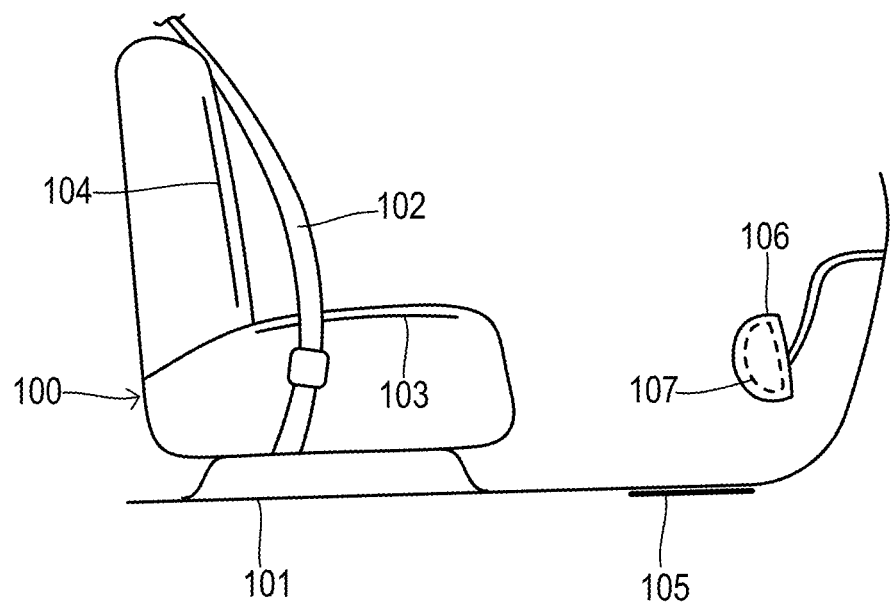
FIG. 12 is a diagram showing alternative placements for a user grounding path.

In order to ensure sufficient signal strength across the interface between the user's finger and the touchscreen electrode, a sufficiently consistent grounding path needs to be provided to the user. This can be achieved in the automotive environment by one or multiple concurrent grounding paths that capacitively couple the user to a vehicle's common ground. Several non-limiting examples for user grounding paths are shown in FIG. 12. A user's seat 100 is supported on a vehicle floor 101. A seatbelt 102 may be strapped over the user while seated. To provide an integrated conductive element, seatbelt 102 may be fabricated with an outer insulative flexible material such as polyester over a conductive layer made of a polymeric material loaded with conductive filler particles. Alternatively, seatbelt 102 may include a webbing layer made from conductive fibers (as disclosed in U.S. Pat. Nos. 7,871,945 or 7,886,617). An end of the conductive element within seatbelt 102 is connected to ground via the vehicle body or frame (not shown). In addition to or alternatively, a conductive element made from conductive fibers or a conducting sheet of various kinds can be incorporated in a seating surface such as conductive element 103 in a seat bottom surface or conductive element 104 in a seat back surface. The conductive elements in seatbelt 102 or seat surfaces 103 and 104 interface with the user's torso in order to create effective capacitive paths to ground. The conductive element can also be provided by a steel floor 101 or a separate footplate 105 in order to capacitively couple through the user's feet. Likewise, a brake or accelerator pedal 106 can include a conductive element 107 capacitively coupling with the user's foot. Although not shown in FIG. 12, a grounding path could also be provided via the steering wheel or a gear shift selector handle for the driver, or the door arm rest.

Figure 13:
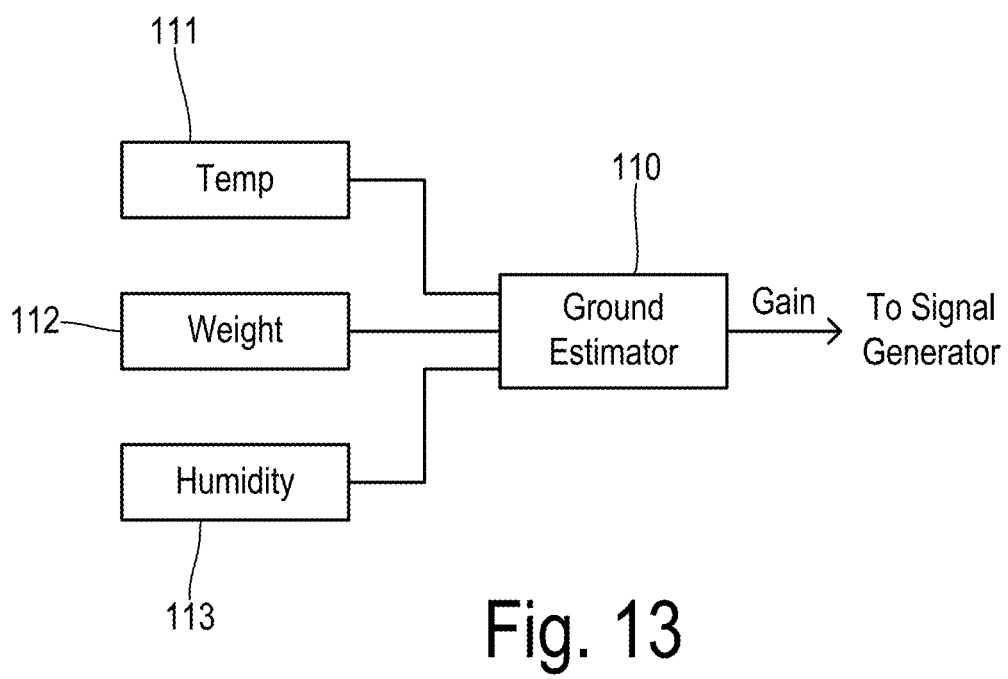
FIG. 13 is a block diagram showing derivation of a gain for compensating for variations in the coupling of the user to a ground reference.

Due to various changing conditions, the impedance associated with the capacitive coupling of the user to the common ground via the conductive element incorporated in the seatbelt, seat surface or other vehicle structures, the effectiveness of creating the perceived texture variations can be affected. To handle the changing conditions, the signal generator can employ a constant current source that automatically compensates for variations in the grounding impedance. Alternatively, the gain utilized in the signal generator when generating the oscillating signal can be adjusted based on other estimates or characterizations of the grounding impedance. As shown in FIG. 13, a ground estimator 10 may receive inputs from a temperature sensor 111, a weight sensor 112, and a humidity sensor 113 which measure various operating conditions which may influence the effectiveness of the grounding path. For example, in cold weather the user may be wearing extra clothing which reduces the effective capacitance obtained via conductive elements in the seatbelt and seat. Consequently, when a low ambient temperature is detected, ground estimator 110 increases a gain command provided to the signal generator for boosting the oscillating signal so that the desired texture perception is obtained. A weight signal from weight sensor 112 can provide a measure of body size which may also influence the effective capacitance. Humidity sensor 113 provides a humidity measurement which can reflect the environmental dielectric properties which can also influence the ground coupling, so that the gain can be appropriately compensated.

In further embodiments of the invention, a touchscreen control panel is adapted to provide touch-based menu controls separate from a visual menu for use by a passenger in a secondary seating location (especially visually impaired passengers) without impacting the use of the visual menu by the passenger (e.g., driver) in a first seating location. Thus, a center stack touchscreen Friction Display in a vehicle provides one set of touch controls and HMI data to the driver (normal vision and use) while simultaneously providing either the same control options and HMI to the passenger in Braille form or a completely different set of information in Braille form. For example, the driver could see all the normal controls and HMI they prefer while the passenger could issue commands for audio, navigation, HVAC, and other functions normally associated with other screens without impacting what the driver sees when they touch the screen. One common display shows both visual information and tactile information in a "dual-view mode" where two different sets of display information, which may have no shared relevance, are presented simultaneously. Touches from the Braille user do not disrupt normal touch function for the driver (due to different signals). Each of the two separate users need only touch the screen with one finger, and can do so simultaneously. When some menu functions are being restricted for a driver, they may be allowed for a Braille reading passenger. This dual view Braille screen could be used in the front row or 2nd or 3rd row seating locations. Further, it could be used in autonomous courier vehicles, taxis, or other types of passenger vehicles to allow the visually impaired to issue commands from the screen while also providing normal text or HMI images for seeing passengers to offer aid to the visually impaired passenger.

The Braille language used for the Braille screen can automatically default to match the language of the driver, but the system may also allow for different languages to be used for the visual text and Braille text. In some embodiments disclosed below, an audio prompt may be generated to read aloud a portion of the Braille text over the vehicle audio system in response to a gesture on the Braille text. In that event, the audio prompt can use the default language of the in-vehicle voice response system or an alternate language if one has been selected for the Braille text.

Each seating location is provided with a unique injection current signal generator that capacitively couples the AC current or signal via the seat cushion, seat belt, foot pedals, arm rest, steering wheel, door handle strap, or other source points into the vehicle occupants. In the case of the driver, injection signal "A" would be capacitively coupled to the touch screen such that when the driver touches the screen the signal "A" is detected at a precise coordinate on the screen, and the corresponding command would be executed if allowed based on the present state of the vehicle (i.e., engine on, off, speed within a prescribed range, drive mode, country, etc.). Similarly, injection signal "B" would be capacitively coupled to the touch screen from the passenger zone such that when the passenger touches the center screen it would detect signal "B" at a precise coordinate on the screen and would process the commands allowed or scroll through various menu pages and/or information according to the present state of the vehicle (i.e., engine on, off, speed within a prescribed range, drive mode, country, etc.).

Since Braille typically takes much more space than the equivalent visual English word, it is preferable not to simply place Braille where the visual icon or text of the visual menu resides on the screen. Instead, the corresponding information normally presented visually is presented tactilely in a series of rows in the Braille screen. This allows the full width of the display to be used to show the Braille text.

Since the layout of each touchpanel menu screen is unique (with buttons and icons in inconsistent locations), a matching layout similar to the visual screens would be confusing if a similar method was used for a Braille screen. To address this, each Feature Screen of the invention has a consistent and familiar structure. The lowermost row is a navigation row, in which the lower left corner of the Braille screen indicates the current Feature Screen category (i.e., a menu page) and the lower right corner of the Braille screen indicates a next available Feature Screen (i.e., next menu page) accessible via a menu navigation command (e.g., a long swipe from right to left). The rows above the bottom row are Selection/Information rows that provide feature data and active feature adjustment symbols (all in Braille) pertaining to the current Feature, with the most important information for that screen being presented in a top row. In a preferred embodiment, there are five rows (one navigation row and four selection rows) extending across the screen and separated by Braille bumper guidelines. So that more than four lines of Braille text can be provided for a particular Feature Screen, the top and/or bottom selection rows double as a navigation row when more lines are available for scrolling. When the reader reaches the end of the last row, they may summon up successive lines by placing their finger toward the right of the row and performing a long swipe left (e.g., 2-3 inches) to initiate scrolling.

If the user's finger is static on a specific point of the screen, there is no sensation of a texture or a bump. The feeling of a bump or texture is generated by movement working against opposing electrical charges. Therefore, to feel the Braille text, the person must sweep their finger across the screen left to right, and it must be assumed that all single touches of the screen are attempts to read the Braille. Further, as a visually impaired person is scanning a set of Braille text, they may stop and back-up or dwell at a point on the display. This cannot be considered a command input as it is normally processed on a typical touchscreen. Therefore, command inputs in the present invention are comprised of either vertical swipes or deep and long right to left swipes.

When the finger is resting on an active Braille command, the user can command that action by swiping vertically (e.g., down). If they want to cancel and return to the previous state, they can swipe in the opposite vertical direction (e.g., up). For user commands associated with functions that are adjusted up or down (e.g., audio volume or HVAC temperature), the up swipe and down swipe would instead be mapped to up and down commands rather than accept or cancel.

Since there can be challenges reading Braille via an outreached finger if vehicle movement is generating vibrations on the screen-finger junction, the display's mechanical frame may preferably contain a rest for the lower palm of the hand or the thumb. Furthermore, each line of Braille text is isolated by bumper guide lines as part of the texture pattern created on the Friction Display. The bumper guide lines can be both horizontal (between rows) and vertical (within a row between different text segments). Additionally, the font size can be increased when detected road vibration increases.

In the case where a user may be reading Braille using two fingers side-by-side, the microcurrent being used to generate the friction feel (e.g., 150 µA) will be split roughly between each digit resulting in roughly a 50% reduction in sensation at each fingertip. To compensate for this loss of signal amplitude, the system may double the signal current to maintain a sufficient textual feel when such a two finger configuration is detected.

Some Braille users may utilize scrubbing movements in circular motions and/or up and down motions to analyze the Braille. It is important to ensure the threshold for the vertical command swipes is significantly greater than up/down variances that will occur during scrubbing. In some embodiments, vertical swipe commands are briefly inhibited if circular or scrubbing motion is detected. For example, if scrubbing was present 200 msec prior to a vertical swipe action, the action would be ignored but a second attempt following it would be processed.

The system of the invention can have a calibration setting for each individual Braille user to adjust the current level of the oscillating signals based on differences between user sensitivity or other factors (e.g., calloused fingers or nerve sensitivity). The setting could be part of a personalization configuration matched to the user when they identify themselves to the vehicle.

In the event that a Braille user may be stuck on a word or not recognize the word or the context, the system of the invention can be used to generate audio presentation of selected segments within the onscreen Braille text. For example, a fast double swipe up/down similar to a double-click on mouse can be used to command the system controller to use a speech generation system to read aloud the corresponding Braille text.

Jumbo Braille is an alternative set of symbols for readers who choose to learn only uncontracted Braille for personal needs. The invention can provide a mode wherein very large Jumbo Braille could be pushed to ¼ or ½ screen through another unique gesture such as a fast right to left action repeated twice is a very short period.

The Friction Display texture function of the invention can either be used exclusively for the nonvisual menu mode (i.e., only when the secondary or visually impaired used is touching the screen) or used both for the nonvisual and visual modes (i.e., giving the driver a texture corresponding to the visual menu when only the driver is touching the screen). In any event, it is preferably to selectably activate a Braille mode only when necessary. The Braille mode can be activated in response to a set-up menu by the driver, in response to a spoken command to a voice recognition system, in response to facial recognition by a camera system, in response to the secondary seat passenger touching a predetermined sensor in the vehicle while engaged with the screen, or in response to detecting a smartphone or other device associated with the Braille user being present in the secondary seating location.

Figure 14:
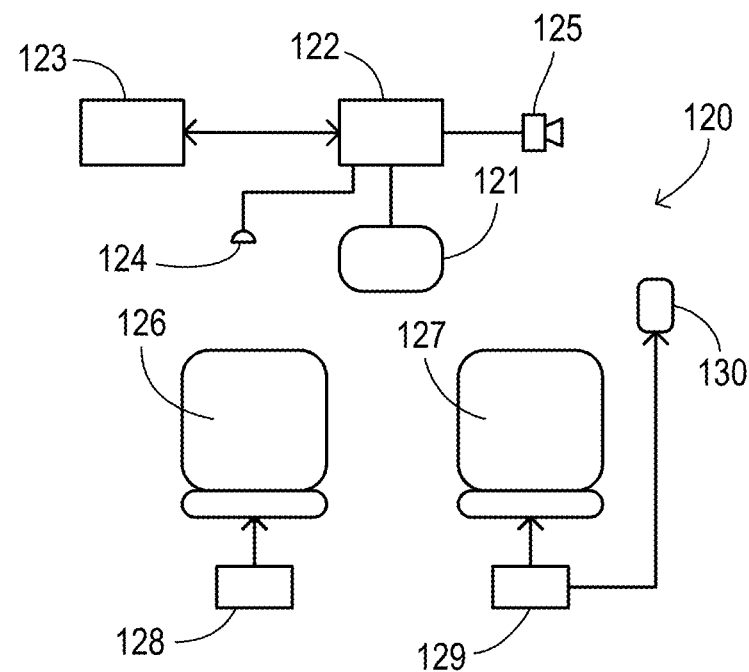
FIG. 14 is a block diagram showing vehicle apparatus including a shared touchscreen control panel and having capability to differentiate between the touch of passengers in different seating locations.

Referring now to FIG. 14, a vehicle control system 120 for presenting contextual menus for adjusting vehicle accessories includes a touchscreen control panel 121 with a haptic frictional display capable of generating textures to be sensed by a passenger in a nonvisual menu mode. Touchscreen panel 121 is coupled to a human-machine interface (HMI) controller 122 which communicates with one or more vehicle accessory systems 123 such as an audio entertainment system, HVAC climate control system, or navigation system. HMI controller 122 may be coupled to a microphone 124 and a speaker 125 in order to provide voice control and feedback as known in the art.

Vehicle occupants (such as a driver and a front seat passenger) can utilize touchscreen panel 121 to operate the vehicle accessories from respective seating locations 126 and 127. Signal generators 128 and 129 generate respective unique oscillating signals which are coupled (e.g., capacitively coupled) to the occupants in seats 126 and 127, respectively. Alternatively, an oscillating signal can be coupled to an occupant via other vehicle structures, such as a capacitive coupling 130 for the occupant of seat 127 located on a door armrest 130.

Figure 15:
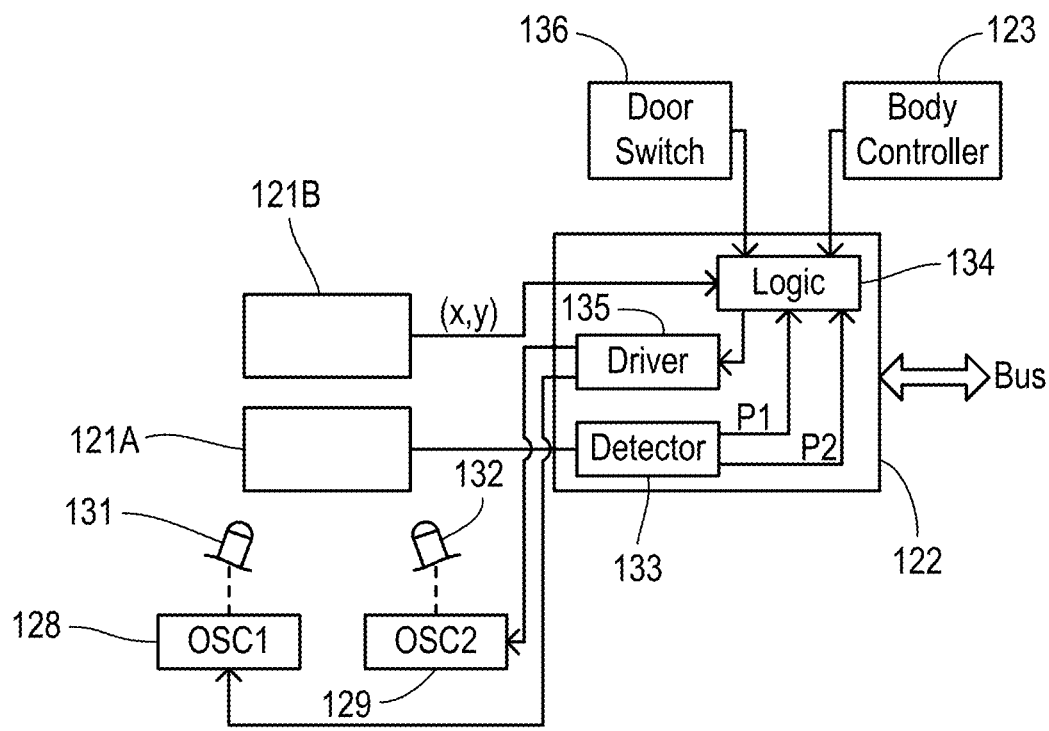
FIG. 15 is a block diagram showing a control apparatus in greater detail.

FIG. 15 shows that either a finger 131 of an occupant of seat 128 or a finger 132 of an occupant of seat 129 can be pressed onto an electrode 121A to complete an electrostatic circuit by which the oscillating signals generate a simulated texture as the finger moves over electrode 121A. By completing the circuit, a detector 133 (within controller 122) which is coupled to electrode 121A can discern which finger 131 or 132 is touching the electrode by detecting which of the unique oscillating signals (OSC1 or OSC2) is being electrostatically coupled. Thus, detector 133 provides a signal P1 and/or a signal P2 to a logic circuit 134 so that, when an occupant is present in seat 129, the control circuit may potentially enter a nonvisual mode for the occupant in seat 129 while simultaneously continuing to provide a visual menu mode for the occupant of seat 128. During all phases of operation, a driver 135 coupled to logic circuit 134 preferably drives the unique oscillating signals via signal generators 128 and 129, and then during the nonvisual mode drives them with the oscillating signals necessary to generate the desired textures for implementing the tactile (e.g., Braille) symbols to be used for the nonvisual mode.

As one of the potential methods for initiation of the nonvisual (e.g., Braille) mode, a door mounted switch 136 is coupled to logic circuit 134 so that the seat occupant can manually place HMI controller 122 into the nonvisual mode. Logic circuit 134 is further coupled to touch-sensitive panel 121B in the touchscreen control panel which provides the x and y coordinates of the contact point(s) where the finger(s) press against it. Logic circuit 134 includes a texture mapping of the type described above, and in this embodiment the texture mapping corresponds to a browsable Braille menu which conveys nonvisual information to the secondary (e.g., non-driver) occupant which is typically independent of the graphical HMI being simultaneously displayed in a visual mode. In the visual mode, a tap is generally used to generate a user command. In the nonvisual mode, a tap is generally ignored and user commands require more extended gestures such as a long right to left swipe or vertical swipes of various kinds.

Figure 16:
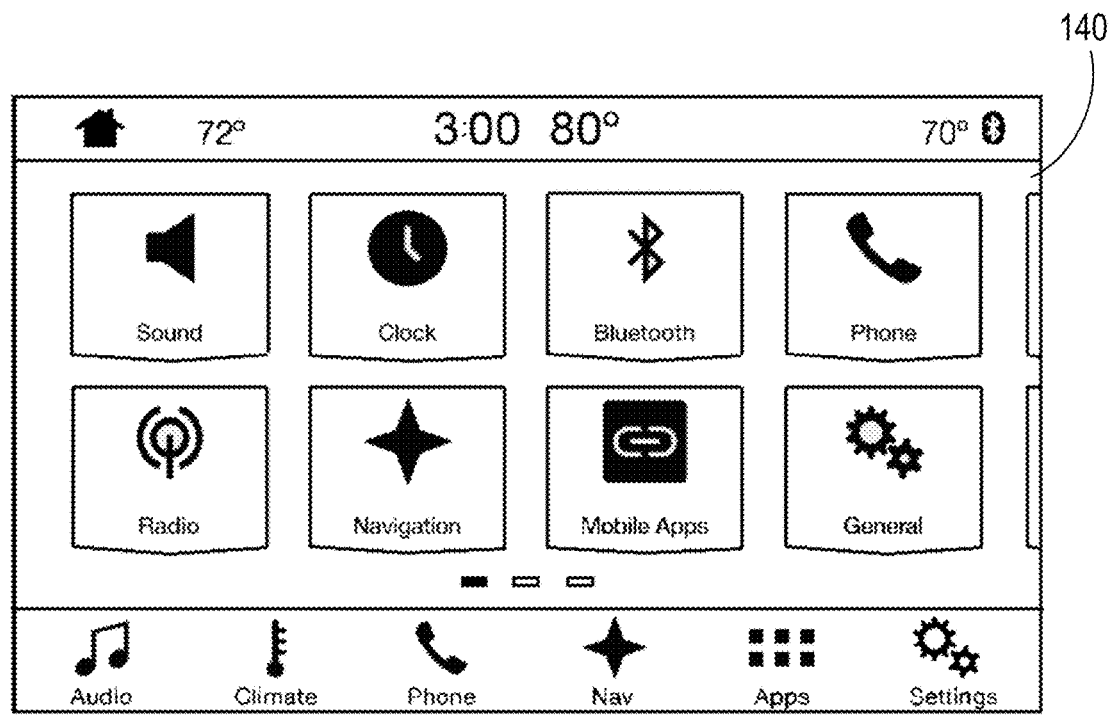
FIG. 16 is a plan view showing an example Home screen for a graphic HMI of a touchscreen control panel.
Figure 17:
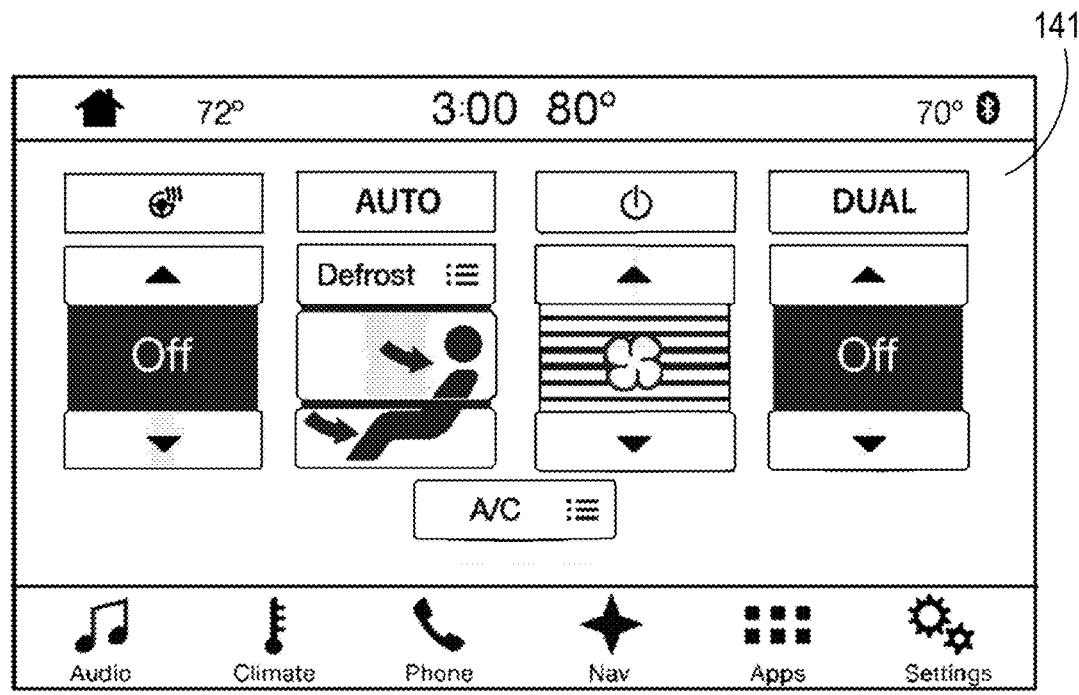
FIG. 17 is a plan view showing an example HVAC control screen for a graphic HMI of a touchscreen control panel.

FIG. 16 shows elements of a home screen 140 for a graphical HMI in a conventional visual mode. Taps on the touchscreen may be used to call up a climate control screen 141 as shown in FIG. 17. When the nonvisual mode becomes active, the visual mode remains responsive to touches from the driver (primary occupant) while being nonresponsive to touches from the passenger (secondary occupant). That is to say, the graphical HMI ignores touches by the passenger and the controller only responds to the extended gestures of the nonvisual mode at the screen location being touched by the passenger. The simultaneous screen modes are depicted in FIG. 18 wherein an HVAC control menu page 142 is visually displayed while a nonvisual texture pattern 143 simulating Braille text overlying the visual menu is perceivable to the secondary passenger.

Texture pattern 143 shown separately in FIG. 19 includes five horizontal rows for Braille symbols including a bottom navigation row 145, a top selection/information row 146, and intervening selection/information rows 147-149. When more than four lines of feature data and/or adjustment hotspots are available for a particular feature page, then row 149 and/or row 146 may also provide the function of a navigation row for scrolling within the page.

Bottom navigation row 145 contains an active screen (i.e., feature) identifier block 150 and a next active screen identifier block 151. Row 145 is delineated by a horizontal bumper guide 152 (between rows 145 and 149) and a vertical bumper guide 153 (between blocks 150 and 151). Horizontal bumper guide lines 154, 155, and 156 separate Braille text rows 146-149. Preferably, bumper guides 152 and 153 are generated having a stronger texture than guides 154-156 (e.g., having a higher friction) to more readily perceive the location of navigation row 145.

FIG. 20 shows a translated representation of the Braille symbols of FIG. 19. In the illustrated example, the current feature screen corresponds to an Audio menu page. The selection/information rows contain text information about the current audio source (e.g., the FM radio) as well as the currently tuned radio station and the artist and song title of a song being played. Block 151 identifies the next feature as being a Climate menu feature screen.

A generic browsable Braille menu structure according to one preferred embodiment of the invention is shown in FIG. 21. A bottom navigation row has Braille text identifying the current active screen ID and identifying a next up screen ID. A long right-to-left swipe gesture made in the navigation row calls up the next menu page. In order to avoid confusion with finger movement associated with reading of the Braille texture (which is generally horizontal from left to right), the navigation gesture is preferably tracked as being longer than a predetermined distance. The distance is greater than a nominal distance suitable to the display size (preferably about 1 or 2 inches). At a minimum, the required right-to-left swipe distance should be more than the width of two or three Braille symbols.

A top Text/Selection Row #1 generally provides important header information (e.g., identifying the most significant information for the feature screen), at least until the row contents may be scrolled to another line of the menu page. There are a fixed number of text/selection rows, and therefore a fixed number of total rows. In the illustrated embodiment, there are three additional text/selection row designated Text/Selection Row #2, Text/Selection Row #3, and Text/Selection Row #4. In addition to providing data and information, each text/selection row may or may not include a Selection Area when a Braille word corresponds to a user adjustment command which can be activated by a vertical swipe. In addition, Text/Selection Row #1 and Text/Selection Row #4 can act as a navigation row to scroll down (in Text/Selection Row #4) or scroll up (Text/Selection Row #1) when a long right-to-left swipe gesture is made at that row.

Figure 22:
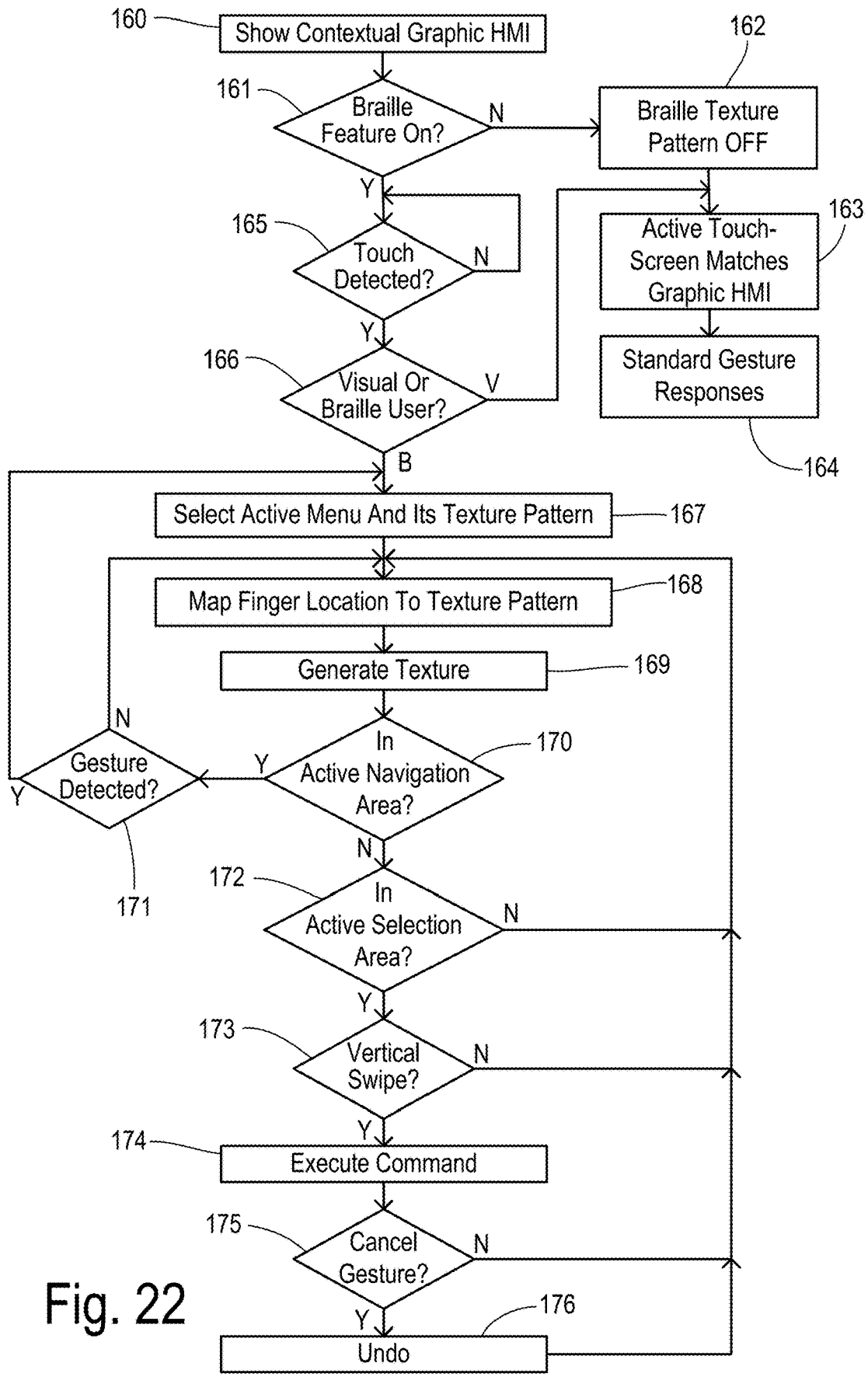
FIG. 22 is a flowchart showing one preferred method of the invention.

FIG. 22 shows a preferred method of the invention. The touchscreen control panel shows the contextual graphic HMI in step 160. A check is performed in step 161 to determine whether the Braille feature is turned on. If not, then the Braille texture pattern is turned off or remains off in step 162. In step 163, the active touchscreen is operated in a way that matches the graphic HMI so that screen taps correspond to the visual menu. Thus, standard gesture responses are utilized in step 164.

In the event that the Braille feature is turned on in step 161, then the touchscreen control panel system operates in both a visual and nonvisual mode. A nonvisual mode monitors for the touchscreen being touched in step 165. When a touch is detected, then a check is performed in step 166 to determine whether a visual user or a Braille user has touched the control panel. If the visual user such as the driver has instituted a touch gesture then the method proceeds to step 163. If the Braille user is detected, then an active menu page and its texture pattern are selected in step 167. The active feature or menu page selected may correspond to a default menu page or may be the menu page that was last accessed by the Braille user during prior use. In step 168, a finger contact location on the touch screen is mapped to a corresponding texture pattern for the active menu page. The Braille texture corresponding is generated in step 169.

In step 170, the contact point for the finger of the Braille user is compared to the current layout of the active menu to determine whether the contact point is in an active navigation area. As previously described, the navigation area can be either the navigation row at the bottom of the menu screen or can be the top or bottom text/selection row when additional lines are available for scrolling. If in a navigation area, then a check is performed in step 171 to determine whether a navigation gesture is detected. If not, then return is made to step 168 to continue to map the finger location to a corresponding textured pattern for the current Braille menu page or portion. If the navigation gesture is detected, then the method returns to step 167 for selecting a new active menu page or portion and its corresponding texture pattern.

If not in an active navigation area, then the method proceeds to step 172 where a check is performed to determine whether the finger contact point is in an active selection area within the selection rows. If not, then a return is made to step 168 to continue mapping the finger location to the texture pattern including any Braille symbols for the current page. If in an active selection area, then a check is performed in step 73 to monitor for a vertical swipe which satisfies the criteria for being a selection gesture. If not present, then the method returns to step 168. Otherwise, the user adjustment command corresponding to the selection area where the vertical swipe occurred is executed in step 174 (e.g., the blower speed is adjusted or the audio source is changed). Preferably, the method then monitors for a cancel gesture in step 175. If no cancel gesture is detected then the method returns to step 168. If a cancel gesture occurs, then the previously executed command is undone (i.e., reversed) in step 176 before returning to step 168.

FIG. 23 shows another example Braille menu page 177. As shown in a text translation in FIG. 24, menu page 177 is for a Climate feature page to control an HVAC Mode. The top text/selection row indicates the HVAC Mode and includes a data field informing the user that a Dual mode is currently selected. The second text/selection row offers the opportunity to change the mode. An active selection area 178 coincides with the Braille text symbols for the term "Non Dual." By making a down-swipe selection gesture in area 178, the user can command a change to the Non Dual mode. Active selection areas 179 and 180 appear over the Braille textual symbols for "Up or Down" in rows flagged as being for the Fan Speed and the Temperature, respectively. A down swipe in areas 179 and 180 are interpreted as commands for reducing the corresponding parameters, while up swipes are interpreted as commands for increasing them. In the lowermost text/selection row, an active navigation area 181 is present due to the availability of additional rows for more Climate adjustments that can be scrolled onto the screen. Area 181 is responsive to a long right-to-left swipe. Since the gestures are unique, areas 180 and 181 may overlap within the row.

Figure 25:
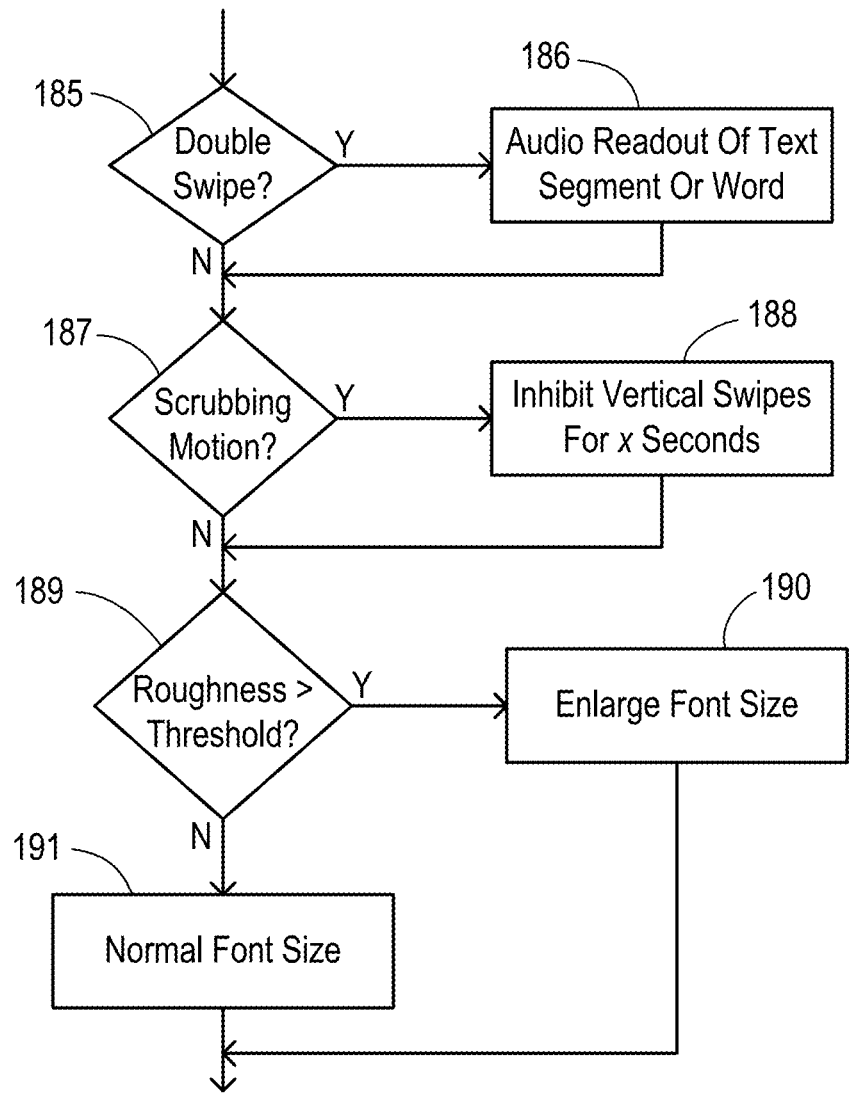
FIG. 25 is a flowchart showing additional functions that can be optionally included in a method of the invention.

FIG. 25 shows a further method of the invention with several additional enhancements. While in nonvisual mode, the invention monitors for a quick double swipe in step 185. If detected, then the Braille word or other text segment where the double swipe occurred is transmitted in step 186 to a speech generation system (e.g., which may be part of a voice recognition control system). The speech generation system generates an audio prompt or readout corresponding to the received text message so that the corresponding text can be heard by the user. In order to direct the audio prompt specifically to the Braille user, the system may restrict the audible prompt to the in-vehicle speaker closest to the Braille user or to a dedicated speaker in that user's headphones or hearing aid (e.g., via Bluetooth). In step 187, the invention monitors for a scrubbing motion (i.e., mixed horizontal and vertical motion) being employed by the Braille user. For example, small circular or transverse pathways of the finger contact point are detected. If they are present, then acceptance of a vertical swipe as a command gesture is inhibited for a predetermined time (e.g., 200 msec) in step 188.

Since vehicle vibrations can interfere with steady placement of the fingertip, the invention can monitor for excessive roughness of the vehicle body in step 189. For example, a roughness detector such as a vertical acceleration sensor mounted to the body of the vehicle generates a roughness signal indicative of the severity of any vertical accelerations. If step 189 determines that the roughness signal is above a predetermined roughness threshold, then the font size of the Braille symbols in the current texture pattern is enlarged in step 190. The amount of enlargement can be proportional to the magnitude of the roughness signal. If roughness is not above the threshold, then a normal font size is adopted in step 191.

What is claimed is:

1. A control system for a vehicle with first and second passenger seats, comprising:
   a touchscreen display for displaying a graphical HMI and detecting at least one contact point on the display established manually by touching by a finger of a passenger;
   a haptic texture system having an electrode disposed across the touchscreen display and first and second signal generators generating first and second oscillating signals coupled to the first and second seats, respectively, to produce a respective potential difference between the finger and the electrode resulting in a corresponding perceived texture as the finger slides over the touchscreen display; and
   a control circuit determining which of the oscillating signals is associated with a detected touch of a finger to identify a corresponding seat, wherein the control circuit has a nonvisual mode triggered according to occupancy in the second seat, wherein when the first seat is identified in the nonvisual mode then control actions are executed in response to a finger touch at a location defined by the graphical HMI, and wherein when the second seat is identified in the nonvisual mode then finger touches are ignored at least at some of the locations defined by the graphical HMI and the control circuit sets at least a frequency or amplitude of the oscillating signal to vary the perceived texture generated across the touchscreen display to convey nonvisual information.

2. The system of claim 1 wherein the nonvisual mode is independent of the graphical HMI.

3. The system of claim 1 wherein the occupancy of the second seat which triggers the nonvisual mode is comprised of a second seat passenger being identified as visually impaired, and wherein the perceived texture includes a Braille symbol pattern.

4. The system of claim 3 wherein the perceived texture comprises a browsable Braille menu having a plurality of static rows separated by framing lines, wherein the rows include a navigation row for navigating through the menu.

5. The system of claim 4 wherein the control circuit recognizes a menu navigation command in response to a right to left swipe of a finger in the navigation row for a length greater than a nominal width of two Braille symbols.

6. The system of claim 3 wherein the perceived texture comprises a browsable Braille menu having a plurality of static rows separated by framing lines, wherein the rows include a selection row including a selectable Braille symbol defining a user command, and wherein the control circuit executes the user command in response to a vertical swipe at the selectable Braille symbol.

7. The system of claim 6 wherein the vertical swipe recognized by the control circuit is comprised of a pair of vertical swipes within a predetermined time.

8. The system of claim 6 wherein the control circuit monitors the touchscreen display for a cancel command within a predetermined time after the vertical swipe, wherein the vertical swipe for executing the user command is directed in a first vertical direction, wherein the cancel command is comprised of a swipe directed in an opposite vertical direction, and wherein the control circuit undoes the user command in response to the cancel command.

9. The system of claim 6 wherein the control circuit monitors the touchscreen display for a predetermined mixed horizontal and vertical scrubbing motion of the contact point within the selection row, and when the predetermined scrubbing motion is detected then ignoring a vertical swipe at the selectable Braille symbol for a predetermined period of time.

10. The system of claim 6 further comprising:
    a speech generation system for generating audio prompts corresponding to predetermined text messages:
    wherein the control circuit monitors the touchscreen display for a double vertical swipe at locations corresponding to respective text segments of the Braille symbols, and wherein the control circuit transmits a corresponding text segment to the speech generation system when the double vertical swipe is detected.

11. The system of claim 3 wherein the perceived texture comprises a browsable Braille menu having a fixed number of static rows separated by framing lines, wherein the rows include a lowermost navigation row for entering a menu navigation command in response to a right to left swipe of a finger to advance to a successive menu page, wherein the rows include text rows above the navigation row containing Braille symbols identifying adjustable features, wherein the text rows include an active selection area having a predetermined Braille symbol corresponding to a user command, wherein the control circuit executes the user command in response to a vertical swipe at the selectable Braille symbol, and wherein the control circuit scrolls a successive line of Braille symbols into the text rows for a current menu page in response to a right to left swipe of a finger in a lowermost text row adjacent the navigation row.

12. The system of claim 11 wherein the control circuit scrolls a previous line of Braille symbols into the text rows for a current menu page in response to a right to left swipe of a finger in an uppermost text row.

13. The system of claim 3 further comprising:
    a roughness detector responsive to vertical displacements of a body of the vehicle to generate a roughness signal;
    wherein the Braille symbol pattern has a first font size when the roughness signal is below a threshold and has a second font size larger than the first font size when the roughness signal is above the threshold.

14. A control system for adjusting passenger accessories in a vehicle, comprising:
    a touchscreen for detecting at least one contact point on the display established manually by touching by a finger of a passenger, wherein the touchscreen includes a graphical display for displaying a visual contextual menu identifying adjustable features of the passenger accessories;
    a haptic texture system having an electrode disposed across the touchscreen and a signal generator generating an oscillating signal to produce a potential difference between the finger and the electrode resulting in a corresponding perceived texture as the finger slides over the touchscreen; and
    a control circuit responsive to the contact point in a visual menu mode corresponding to the visual contextual menu when the passenger touching the touchscreen is a driver and responsive to the contact point in a nonvisual menu mode corresponding to a nonvisual contextual menu when the passenger touching the touchscreen is not the driver, wherein the control circuit is configured to set at least a frequency or amplitude of the oscillating signal when in the nonvisual menu mode to vary the perceived texture generated across the touchscreen in a pattern corresponding to a browsable Braille menu having a plurality of static rows separated by framing lines, wherein the rows include a navigation row for navigating through the menu, wherein the Braille menu includes Braille symbols according to the nonvisual contextual menu, and wherein the visual contextual menu and the nonvisual contextual menu are different.

15. The control system of claim 14 wherein the control circuit recognizes a menu navigation command in response to a right to left swipe of a finger in the navigation row to advance to a successive menu page.

16. The control system of claim 15 wherein the rows include a selection row including a selectable Braille symbol defining a user command, and wherein the control circuit executes the user command in response to a vertical swipe at the selectable Braille symbol.

17. The control system of claim 16 wherein the vertical swipe recognized by the control circuit is comprised of a pair of vertical swipes within a predetermined time.

18. The control system of claim 16 wherein the control circuit monitors the touchscreen for a cancel command within a predetermined time after the vertical swipe, wherein the vertical swipe for executing the user command is directed in a first vertical direction, wherein the cancel command is comprised of a swipe directed in an opposite vertical direction, and wherein the control circuit undoes the user command in response to the cancel command.

19. The control system of claim 16 wherein the control circuit monitors the touchscreen for a predetermined mixed horizontal and vertical scrubbing motion of the contact point within the selection row, and when the predetermined scrubbing motion is detected then ignoring a vertical swipe at the selectable Braille symbol for a predetermined period of time.

20. The control system of claim 16 further comprising:
a speech generation system for generating audio prompts corresponding to predetermined text messages:
wherein the control circuit monitors the touchscreen for a double vertical swipe at locations corresponding to respective text segments of the Braille symbols, and wherein the control circuit transmits a corresponding text segment to the speech generation system when the double vertical swipe is detected.

21. The control system of claim 16 wherein the browsable Braille menu has a fixed number of static rows separated by the framing lines, wherein the navigation row is lowermost, wherein the selection rows include textual content above the navigation row containing Braille symbols identifying adjustable features, wherein the selection rows include an active selection area having a predetermined Braille symbol corresponding to a user command, wherein the control circuit executes the user command in response to a vertical swipe at the selectable Braille symbol, and wherein the control circuit scrolls a successive line of Braille symbols into the text rows for a current menu page in response to a right to left swipe of a finger in a lowermost text row adjacent the navigation row.

22. The control system of claim 21 wherein the control circuit scrolls a previous line of Braille symbols into the selection rows for a current menu page in response to a right to left swipe of a finger in an uppermost selection row.

23. The control system of claim 14 further comprising:
a roughness detector responsive to vertical displacements of a body of the vehicle to generate a roughness signal;
wherein the Braille symbol pattern has a first font size when the roughness signal is below a threshold and has a second font size larger than the first font size when the roughness signal is above the threshold.

24. A touchscreen control panel system in a transportation vehicle having a driver seat and a passenger seat, comprising:
a graphical display for displaying a visual contextual menu for predetermined vehicle accessories;
a touchscreen overlying the display responsive to contact by a finger of a first passenger in the driver seat to enter selections in the visual contextual menu;
a transparent texture electrode overlying the display responsive to contact by a finger of a second passenger in the passenger seat; and
first and second signal generators generating first and second oscillating signals coupled to the driver and passenger seats, respectively, to produce a respective potential difference between the fingers of the passengers and the transparent texture electrode resulting in a corresponding perceived texture as the finger slides over the touchscreen;
wherein the transparent texture electrode responds to the second oscillating signals to create a Braille contextual menu simultaneously with the visual contextual menu during contact by the finger of the second passenger, and wherein the touchscreen responds to the second oscillating signals to enter selections in the Braille contextual menu during contact by the finger of the second passenger.

* * * * *